United States Patent
Zhu et al.

(10) Patent No.: US 8,402,369 B2
(45) Date of Patent: Mar. 19, 2013

(54) MULTIPLE-DOCUMENT SUMMARIZATION USING DOCUMENT CLUSTERING

(75) Inventors: Shenghuo Zhu, Santa Clara, CA (US); Dingding Wang, Miami, FL (US); Yun Chi, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 970 days.

(21) Appl. No.: 12/199,104

(22) Filed: Aug. 27, 2008

(65) Prior Publication Data

US 2009/0300486 A1    Dec. 3, 2009

Related U.S. Application Data

(60) Provisional application No. 61/056,595, filed on May 28, 2008.

(51) Int. Cl.
 *G06F 17/00* (2006.01)
(52) U.S. Cl. ...................................................... 715/254
(58) Field of Classification Search .................... 715/254
 See application file for complete search history.

(56) References Cited

PUBLICATIONS

Sun Park et al, "Multi-Document Summarization Based on Cluster Using Non-Negative Matrix Factorization," 2007, p. 761-770.*
Daniel M. Dunlavy et al., "QCS: A System for Querying, Clustering and Summarizing Documents," 2006, p. 1-47.*
Dhillon et al., "Information Theoretic Co-clustering", 2001, pp. 1-10.*
J. Conroy and D. O'Leary. Text summarization via hidden markov models. In *Proceedings of SIGIR*, pp. 406-407, 2001.
G. Erkan and D. Radev. Lexpagerank: Prestige in multi-document text summarization. In *Proceedings of EMNLP*, pp. 1-7, 2004.
J. Goldstein, M. Kantrowitz, V. Mittal, and J. Carbonell. Summarizing text documents: Sentence selection and evaluation metrics, pp. 1-8 of *Proceedings of SIGIR* 1999.
Y. Gong and X. Liu. Generic text summarization using relevance measure and latent semantic analysis. In *Proceedings of SIGIR*, pp. 19-25, 2001.
C.-Y. Lin and E.Hovy. Automatic evaluation of summaries using n-gram cooccurrence Statistics, pp. 1-8 of *Proceedings o fNLT-NAACL* 2003.
R. Mihalcea and P. Tarau. A language independent algorithm for single and multiple document summarization, pp. 1-6 of *Proceedings ofIICNLP* 2005.
Park, J.-H. Lee, D.-H. Kim, and C.-M. Ahn. Multi-document summarization based on cluster using non-negtive matrix factorization, pp. 761-770 of *Proceedings of SOFSEM* 2007.
D. Shen, J.-T. Sun, H. Li, Q. Yang, and Z. Chen. Document summarization using conditional random fields, pp. 2862-2867 of *Proceedings of IICAI* 2007.

* cited by examiner

*Primary Examiner* — Doug Hutton, Jr.
*Assistant Examiner* — Shawn S Joseph
(74) *Attorney, Agent, or Firm* — Joseph Kolodka; Bao Tran

(57) ABSTRACT

Systems and methods are disclosed for summarizing multiple documents by generating a model of the documents as a mixture of document clusters, each document in turn having a mixture of sentences, wherein the model simultaneously representing summarization information and document cluster structure; and determining a loss function for evaluating the model and optimizing the model.

15 Claims, 3 Drawing Sheets

MULTIPLE-DOCUMENT SUMMARIZATION USING DOCUMENT CLUSTERING

This application claims priority to Provisional Application Ser. No. 61/056,595 filed May 28, 2008, the content of which is incorporated by reference.

This application relates to systems and methods for generating a summary of multiple documents.

BACKGROUND

Multi-document summarization is the process of generating a generic or topic-focused summary by reducing documents in size while retaining the main characteristics of the original documents. Since one reason of causing the problem of data overload is that many documents share the same or similar topics, automatic multi-document summarization has attracted much attention in recent years. The explosive increase of documents on the Internet has driven the need for summarization applications. For example, the informative snippets generation in web search can assist users in further exploring snippets, and in a Question/Answer system, a question-based summary is often required to provide information asked in the question. Another example is short summaries for news groups in news services, which can facilitate users to better understand the news articles in the group news. The document summarization can be either generic or query-relevant. Generic multi-document summarization should reflect the general content of the documents without any additional information. Query-relevant multi-document summarization should focus on the information expressed in the given query, i.e., the summaries must be biased to the given query. The system can handle generic and query-relevant multi-document summarization.

The major issues for multi-document summarization are as follows: first of all, the information contained in different documents often overlaps with each other, therefore, it is necessary to find an effective way to merge the documents while recognizing and removing redundancy. Another issue is identifying important difference between documents and covering the informative content as much as possible issue. Current multi-document summarization approaches usually focus on the sentences by terms matrix, either perform matrix factorization or sentence similarity analysis on it, and group the sentences into clusters. Then, the summaries can be created by extracting representative sentences from each sentence cluster. The problem of these existing approaches is that they ignore the context dependency of the sentences and treat them as independent of each other during the sentence clustering and extraction. However, the sentences within the same document or the same document cluster do have mutual influence which can be utilized as additional knowledge to help the summarization. Thus, given a collection of documents, discovering the hidden topics in the documents by document clustering can benefit the sentence context analysis during the summarization.

To demonstrate the usefulness of the hidden topics embedded in the document clusters, a simple example is shown in Table 1. The synthetic dataset contains four very short articles, each of which contains only two sentences (8 sentences in total). The task is to generate a two-sentence generic summary for these articles.

TABLE 1

| | |
|---|---|
| $D_1$ | $S_1$: Apple Inc. is a corporation manufacturing consumer electronics. |
| | $S_2$: Apple's design seems a lot more revolutionary to most Americans. |
| $D_2$ | $S_4$: The design of Apple's products is more revolutionary than others in the market. |

TABLE 1-continued

| | |
|---|---|
| $D_3$ | $S_5$: Apple is a corporation manufacturing consumer electronics. |
| | $S_6$: The prices of Apple's machines are relatively high with the same performance. |
| $D_4$ | $S_7$: Apple is a corporation manufacturing consumer electronics. |
| | $S_8$: With the similar performance, Apple's machines have higher price than others. |

In the illustrative example of Table 1, A represents the $D_i$ represents the $i^{th}$ document and $S_j$ is the $j^{th}$ sentence. Looking at the data directly, $D_1$ and $D_2$ talks about the nice design of Apple's products, and $D_3$ and $D_4$ are related to the high prices. A high quality summary should includes the two features of Apple's products. However, if the eight sentences were clustered into two groups solely based on the sentence similarity, $S_1$, $S_5$ and $S_7$ are the same and should be assigned into one cluster. And the rest sentences are the other group discussing about Apple's products. If the summary were limited to be two-sentence long, the summary can only cover one feature of the Apple's products, either nice design or high price. Thus, the summary is not comprehensive.

SUMMARY

In one aspect, systems and methods are disclosed for summarizing multiple documents by generating a model of the documents as a mixture of document clusters, each document in turn having a mixture of sentences, wherein the model simultaneously representing summarization information and document cluster structure; and determining a loss function for evaluating the model and optimizing the model.

In another aspect, a method for summarizing documents includes receiving a document language model for a document; extracting sentence candidates from the document and receiving a sentence language model for each sentence candidate; determining model parameters from the document language model and the sentence language model; and generating a summary for the documents.

In yet another aspect, a multi-document summarization system for both generic and query-relevant summarization is based on a language model which can cluster and summarize multiple documents simultaneously. The model translates the clustering-summarization problem into minimizing the Kullback-Leibler divergence between the given documents and model reconstructed terms. The minimization process results a matrix which represents the probability of sentences given clusters (hidden topics). The summary is formed with the sentences with high probability in each cluster. The model shows that the additional knowledge on the hidden topics of the document clusters can influence/help the clustering and extraction of the sentences.

Advantages of the preferred embodiment may include one or more of the following. The system summarizes multiple documents at the same time as clustering documents into the given size of targeted summarization. The system produces a higher quality of summaries by using simple bag-of-words features according to evaluation on the widely-used DUC documents and ROUGE measures. The system is also efficient: the probability of sentences given clusters can be obtained by estimating the parameters, which are the scores to select the summary sentences.

DESCRIPTION

Figure 1:
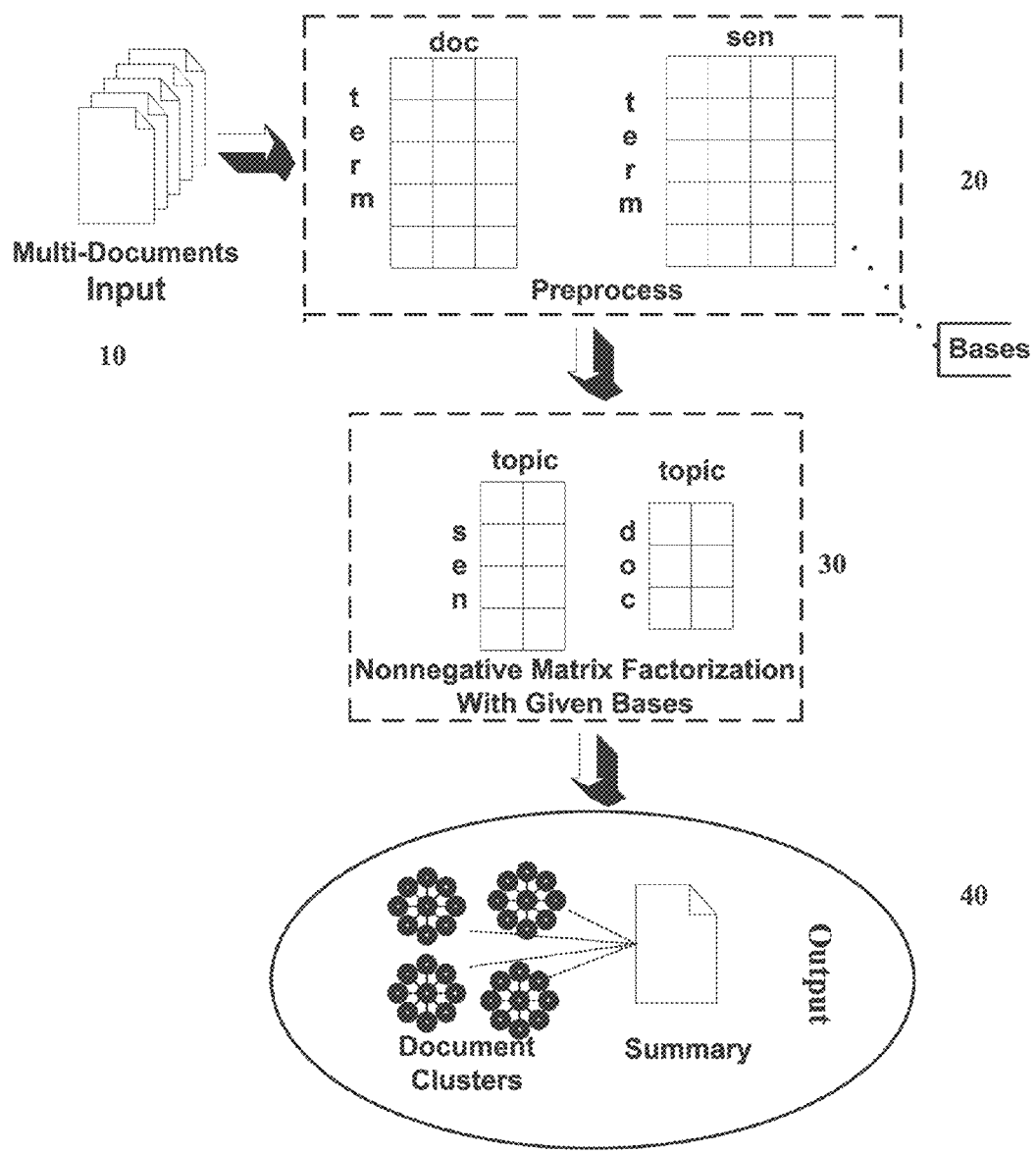
FIG. 1 shows a framework of an exemplary multi-document summarization system.

FIG. 1 shows a framework of an exemplary multi-document summarization system. First, a plurality of documents are received (10). The documents are preprocessed by removing formatting characters and stopping words (20). Then a unigram language model is used to get the documents by terms and sentences by terms matrices. If the task is the query-relevant summarization, the sentences by terms matrix will be projected to a subspace where each sentence candidate is relevant to the query. Then, given the two matrices, the system conducts nonnegative factorization on the documents and simultaneously clusters the documents and sentences into hidden topics (30). A summary is formed with the sentences with a high probability in the topic (40).

Figure 2:
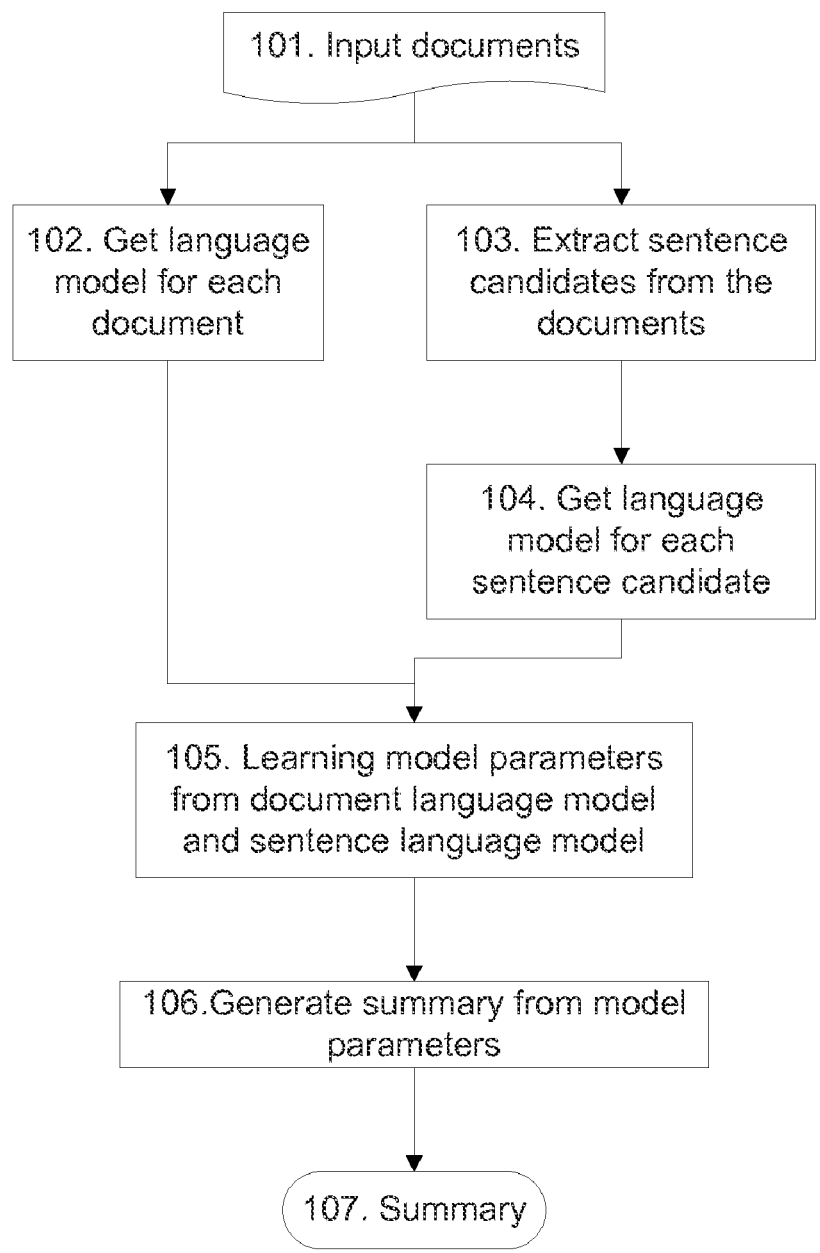
FIG. 2 shows an exemplary process for summarizing multiple documents.

FIG. 2 shows an exemplary process for summarizing multiple documents. In FIG. 2, a number of documents are provided as input in block 101. In block 102, the process obtains the language model for each input document. In one embodiment, the language model can be a unigram language model, namely bag-of-word features, where each feature represents the number of occurrences of a certain word (term) in the document. The features of documents make a matrix, denoted by A. The size of A is the number of features times the number of documents. Each column of A represents a document, each row of A represents a feature (or term in unigram language model). Each entry of A represents the number of occurrences of a certain term in the given document.

In parallel with block 102, the process extracts sentences from the documents in block 103. The documents are split into sentences. Only those sentences suitable for summary are selected as the sentence candidates. Next, in block 104, the process obtains the language model for each sentence candidate identified in block 102. The language model can be as simple as unigram language model, namely bag-of-word features, where each feature represents the number of occurrences of a certain word (term) in the sentence. The feature set is the same as the feature set for document in block 102. The features of sentences make a matrix, denoted by B. The size of B is the number of features times the number of sentence candidates. Each column of B represents a sentences, each row of B represents a feature (or term in unigram language model). Each entry of B represents the proportion of occurrences of a certain term in the given sentence.

In block 105, the process applies learning the model parameters from A and B. This block is detailed in FIG. 3. In block 106, a summary is formed for sentences with high probability in each cluster (U in block 206). In block 107, a summary is generated as the output.

Figure 3:
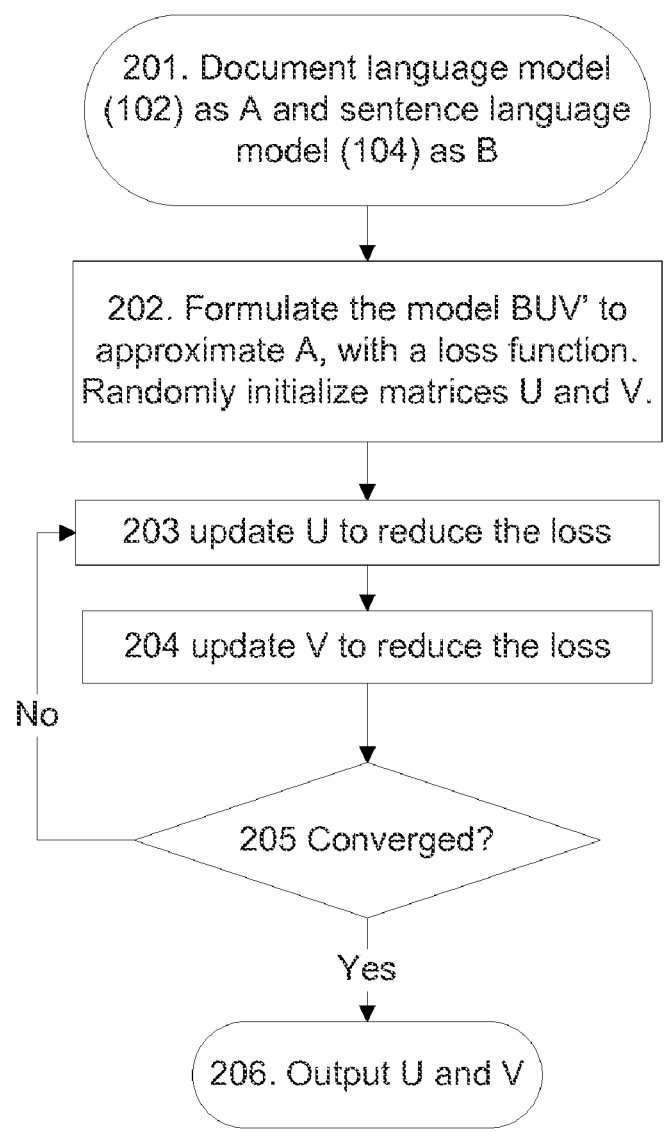
FIG. 3 provides a detailed view of a block to learn model parameters.

FIG. 3 shows block 105 in more detail. In block 201, the process receives as input the document language model A from 102, and the sentence language model B from 104. In block 202, a model $BUV^T$ is formulated, where U is the sentence-cluster matrix and V is document-cluster matrix. The size of matrix U is the number of sentence candidates times the number of clusters. The entries of U are nonnegative. The sum of each column of U is one. Each entry in matrix U represents the probability of a sentence given a cluster. The size of matrix V is the number of documents times the number of clusters. The entries of V are nonnegative. The sum of each row of V is one. Each entry in matrix V represents the probability of a cluster given a document. Therefore, each column of model $BUV^T$ is the features of a corresponding document generated by the model with parameter U and V. The loss A and $BUV^T$ between can be Kullback-Leibler divergence, or Frobenius matrix norm. In block 203, the process updates U to reduce the loss and in block 204, the process updates V to reduce the loss, as discussed in more details below. In block 205, the process repeats blocks 203 and 204 until the loss converges to a predetermined level. In block 206, the process returns the parameter matrix U and V as the output.

An exemplary pseudo-code for the flowchart of FIG. 3 is as follows:

---
Algorithm 1 Nonnegative Factorization with given Bases
---

Input:    A: documents by words matrix,
           B: words by sentences matrix;
Output:  U: sentence-topic matrix;
           V: document-topic matrix,
begin
  1. Initialization:
     Initialize U and V follow Dirichlet distribution,
       with hyper-parameter $\alpha_U$ and $\alpha_V$ respectively,
  2. Iteration:
     repeat
      2.1 Compute $C_{ij} = A_{ij}/[BUV^T]_{ij}$;
      2.2 Assign $U_{st} \leftarrow U_{st} [B^T CV]_{st} + \alpha_U$,
         and normalize each column to 1;
      2.3 Compute $C_{ij} = A_{ij}/[BUV^T]_{ij}$;
      2.4 Assign $V_{dt} \leftarrow V_{dt} [C^T BU]_{dt} + \alpha_V$,
         and normalize each row to 1;
     until convergence
  3. Return U, V
end

---

Next, the language model and the algorithm will be discussed in detail. In the above algorithm, for a generative process of terms, $w \in W$, given a document $d \in D$, the operations include:

pick a topic, $t \in T$, following a multinomial distribution $p(t|d)$, pick a sentence, $s \in S$, following a multinomial distribution $p(s|t)$, pick a term, $w \in W$, following a multinomial distribution $p(w|s)$.

Here, the document, topic, sentence and term makes a tuple, (d,t,s,w).

The process uses empirical distribution of observed sentences for $p(w|s)$, and let $B_{w,s} = \tilde{p}(w|s)$. The model parameters are (U, V), where $$U_{s,t} = p(s|t), \quad (1)$$

$$V_{d,t} = p(t|d) \quad (2)$$

For the prior distribution of U and V, a Dirichlet distribution is obtained with the conjugate prior of multinomial distribution.

$$U_{.,t} \sim Dir(\alpha_{.,t}^U), \quad (3)$$

$$V_{d,.} \sim Dir(\alpha_{d,.}^V). \quad (4)$$

Informatively, the total number of pseudo instances is $\alpha$, and they are evenly distribution on all possible tuples. Since $\alpha_{s,t}^U$ and $\alpha_{d,t}^V$ are considered as the number of pseudo tuples with values of (.,t,s,.) and (d,t,.,.), respectively:

$$\alpha_{s,t}^U = \alpha/(|S| \times |T|), \quad (5)$$

$$\alpha_{d,t}^V = \alpha/(|D| \times |T|). \quad (6)$$

The parameter estimation is MAP estimation (or maximum likelihood estimation) of N observed documents, $A_{w,d}=N\tilde{p}(w,d)$. The task is $$U, V = \underset{U,V}{\operatorname{argmin}} l(U, V), \quad (7)$$

Where $l(U,V)=KL(A\|BUV^T)-\ln \Pr(U,V)$.

For the example given in Table 1, using the above algorithm procedure, the input matrices are as follows:

$$A^T = \begin{pmatrix} 2 & 1 & 1 & 1 & 1 & 1 & 1 & 0 & 0 & 0 & 0 & 0 & 0 & 0 \\ 2 & 1 & 1 & 1 & 1 & 1 & 0 & 1 & 1 & 1 & 0 & 0 & 0 & 0 \\ 2 & 1 & 1 & 1 & 1 & 0 & 0 & 0 & 0 & 0 & 0 & 1 & 1 & 0 \\ 2 & 1 & 1 & 1 & 1 & 0 & 0 & 0 & 0 & 0 & 1 & 1 & 1 & 1 \end{pmatrix}$$

and $$B = \begin{pmatrix} 0.20 & 0.25 & 0.20 & 0.17 & 0.20 & 0.33 & 0.20 & 0.20 \\ 0.20 & & 0.20 & & 0.20 & & 0.20 & \\ 0.20 & & 0.20 & & 0.20 & & 0.20 & \\ 0.20 & & 0.20 & & 0.20 & & 0.20 & \\ 0.20 & & 0.20 & & 0.20 & & 0.20 & \\ & 0.25 & & 0.17 & & & & \\ & 0.25 & & 0.17 & & & & \\ & 0.25 & & & & & & \\ & & & 0.17 & & & & \\ & & & 0.17 & & & & \\ & & & 0.17 & & & & \\ & & & & & & & 0.20 \\ & & & & & 0.33 & & 0.20 \\ & & & & & 0.33 & & 0.20 \\ & & & & & & & 0.20 \end{pmatrix}$$

The process randomly initializes U and V and normalizes them accordingly. After convergence and normalization $$U = \begin{pmatrix} 0.08 & 0.09 \\ 0.00 & 0.13 \\ 0.22 & 0.11 \\ 0.00 & 0.38 \\ 0.21 & 0.20 \\ 0.00 & 0.00 \\ 0.06 & 0.09 \\ 0.43 & 0.00 \end{pmatrix} \text{ and } V = \begin{pmatrix} 0.00 & 1.00 \\ 0.00 & 1.00 \\ 1.00 & 0.00 \\ 1.00 & 0.00 \end{pmatrix}.$$

From U and V, $D_1$ and $D_2$ belong to one cluster and $D_3$ and $D_4$ are in the other group. And $S_4$ and $S_8$ are the two sentences selected to form the summary. The results are consistent with a human's perception.

The above system summarizes multiple documents by utilizing document clusters. This system uses a model that generates documents as a mixture of clusters, which in turn is a mixture of sentences in the documents. By estimating the parameters, the system derives the probability of sentences given clusters, which gives the scores to select the summary sentences. Experimental data illustrates that the system outperforms other methods.

The model of FIG. 3 represents summarization and clustering simultaneously, and the corresponding loss function is used for evaluating the model. This method translates the summarization and clustering problem into minimizing a certain loss between the given documents and model reconstructed terms. Such loss includes Kullback-Leibler divergence, Frobenius matrix norm. The minimization process results a matrix which represents the probability of sentences given cluster. The summary is formed with those sentences with high probability in each cluster. The model of generative processing of terms given a document can be as follows:

Given document pick a cluster following a multinomial distribution,

Given cluster, pick a sentence following a multinomial distribution,

Given sentence pick a term following a multinomial distribution.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method for summarizing multiple documents, comprising:
   a. generating a model $BUV^T$ of the documents as a mixture of document clusters, each document in turn having a mixture of sentences, wherein U is a corresponding sentence-topic matrix, V is a corresponding document-topic matrix, and B is a corresponding term-sentence matrix;
   b. simultaneously representing summarization information and document cluster structure in the model $BUV^T$;
   c. determining a loss function l, where the loss function comprises $l(U,V)=KL(A\|BUV^T)-\ln Pr(U,V)$, where KL is the Kullback-Leibler divergence, and where A is a corresponding term-document matrix;
   d. evaluating and optimizing the model by translating a summarization and clustering problem into minimizing the loss l between the given documents and model reconstructed terms using the maximum likelihood estimation task comprising $$U, V = \underset{U,V}{\operatorname{argmin}} l(U, V);$$

e. generating a summary of the documents at the same time as clustering documents into a given size of targeted summarization based on the model $BUV^T$ and the maximum likelihood estimation task.

2. The method of claim 1, comprising receiving a document language model for each document.

3. The method of claim 2, wherein the document language model comprises a unigram language model.

4. The method of claim 1, comprising extracting sentence candidates from the document and receiving a sentence language model for each sentence candidate.

5. The method of claim 4, wherein the sentence language model comprises a unigram language model.

6. The method of claim 1, comprising determining model parameters U and V from a document language model and a sentence language model.

7. The method of claim 1, comprising generating a matrix A of features of the documents or a matrix B of the features of the sentences.

8. The method of claim 1, wherein each column of the model $BUV^T$ comprises features of a corresponding document generated by the model with parameters U and V.

9. The method of claim 1, comprising formulating the model $BUV^T$ to approximate the document language model.

10. A method for summarizing multiple documents, comprising:
    a. receiving a document language model for each document, wherein the document language models are used to generate a corresponding term-document matrix A;
    b. extracting sentence candidates from the documents and receiving a sentence language model for each sentence candidate, wherein the sentence language models are used to generate a corresponding term-sentence matrix B;
    c. determining model parameters U and V from the document language models and the sentence language models, wherein U is a corresponding sentence-topic matrix, and V is a corresponding document-topic matrix;
    d. simultaneously representing summarization information and document cluster structure in a model $BUV^T$ of the documents as a mixture of document clusters, each document in turn having a mixture of sentences;
    e. minimizing loss according to a loss function l between the documents and model reconstructed terms according to a maximum likelihood estimation task comprising $$\frac{U, V = \operatorname{argmin} l(U, V)}{U, V}; \text{ and}$$

f. summarizing the documents at the same time as clustering documents into a given size of targeted summarization based on the model $BUV^T$ and the maximum likelihood estimation task.

11. The method of claim 10, wherein the document or sentence language model comprises a unigram language model.

12. The method of claim 11, wherein A is a corresponding matrix of features of the documents.

13. The method of claim 11, wherein B is a corresponding matrix of features of the sentences.

14. The method of claim 10, wherein each column $BUV^T$ of the model comprises features of a corresponding document generated by the model with parameters U and V.

15. The method of claim 10, wherein the loss function l comprises a Kullback-Leibler divergence function or a Frobenius matrix norm.

* * * * *